United States Patent
Gallagher et al.

[19]
[11] Patent Number: 6,167,165
[45] Date of Patent: Dec. 26, 2000

[54] METHOD FOR ADJUSTING IMAGE DETAIL TO COMPENSATE FOR AN APPLIED TONE SCALE

[75] Inventors: Andrew C. Gallagher; Edward B. Gindele, both of Rochester, N.Y.

[73] Assignee: Eastman Kodak Company, Rochester, N.Y.

[21] Appl. No.: 09/199,510

[22] Filed: Nov. 25, 1998

[51] Int. Cl.[7] ................................................. G06K 9/40
[52] U.S. Cl. ............................................................ 382/263
[58] Field of Search .................................. 382/263, 261, 382/254, 264, 260, 265, 275

[56] References Cited

U.S. PATENT DOCUMENTS

| | | | |
|---|---|---|---|
| 5,012,333 | 4/1991 | Lee et al. ................................ | 358/80 |
| 5,081,692 | 1/1992 | Kwon et al. ............................. | 382/54 |
| 5,454,044 | 9/1995 | Nakajima ................................ | 382/132 |
| 5,708,518 | 1/1998 | Parker et al. ........................... | 358/534 |
| 5,825,937 | 10/1998 | Ohuchi et al. ......................... | 382/261 |

OTHER PUBLICATIONS

Image Processing Handbook; Author :John Russ; p. 227, 1994.

*Primary Examiner*—Jerome Grant, II
*Attorney, Agent, or Firm*—David M. Woods

[57] ABSTRACT

A method for modifying the spatial frequency detail of a digital image channel, the method comprises receiving a digital image channel; providing a tone scale function; and modifying the spatial frequency detail of the digital image channel based on the characteristics of the tone scale function.

6 Claims, 6 Drawing Sheets

METHOD FOR ADJUSTING IMAGE DETAIL TO COMPENSATE FOR AN APPLIED TONE SCALE

CROSS-REFERENCE TO RELATED APPLICATIONS

The present application is related to U.S. application Ser. No. 09/163,645, filed Sep. 30, 1998, by Andrew Gallagher, et al., and entitled, "A METHOD FOR PRESERVING IMAGE DETAIL WHEN ADJUSTING THE CONTRAST OF A DIGITAL IMAGE".

FIELD OF THE INVENTION

The invention relates generally to the field of digital image processing and, more particularly, to a method for modifying image detail to compensate for an applied tone scale or for the tonal characteristics of an output device.

BACKGROUND OF THE INVENTION

Traditional methods of applying a tone scale function to a digital image modify the apparent sharpness of the image because the tone scale modifies the amplitudes of high frequency detail information. This phenomenon occurs when the tone scale function is applied to each of the color channels independently, or when the tone scale function is applied to the luminance channel of a luminance-chrominance transformed digital image.

For systems in which the spatial filtering step must precede the application of a tone scale function, the resultant image detail will also be adversely modified with respect to the original image. The tonal characteristics of an output device, such as a display monitor and a digital printer, can have the same affect on image detail as an applied tone scale function. For these applications, any spatial filtering operations designed to compensate for the device characteristics must be applied before the image is passed to the device.

The prior art contains several examples which address the problem of detail distortion by tone scale application. Many of these examples utilize frequency decomposition methods in the application of the tone scale function.

For example, to apply a tone scale function to a digital image without distorting the detail information, in U.S. Pat. No. 5,012,333, Lee et al. proposed separating the image into a high frequency and a low frequency image by using FIR filters. The tone scale function is then applied to only the low frequency image, and the high frequency image is added back to the tone scaled low frequency image. Also, in U.S. Pat. No. 5,454,044, Nakajima suggests modifying the image contrast by the formula $$Sproc = Sorg + f(Sus).$$

The low frequency image (Sus) is passed through function f( ) which is a monotonically decreasing function. This signal is added to the original (Sorg) to create the processed image Sproc. Both of these methods apply a tone scale function while attempting to preserve the image detail.

In addition, methods exist in the prior art to improve the detail of a digital image. These methods often utilize unsharp masking, which is well known in the art. Examples exist in the prior art that modify parameters of the unsharp masking adaptively while processing the digital image. For example, in U.S. Pat. No. 5,081,692, Kwon et al describes a method of modifying the gain of an unsharp mask based upon a local center weighted variance. However, none of the prior art methods of sharpening a digital image compensate specifically for the degradation to the image detail that is induced by an applied tone scale function.

In addition, it is well know in the art that various sharpening algorithms may be used to compensate for the loss of spatial detail due to blurring when printing or displaying an image on an output device. This method includes tailoring the sharpening to the spatial characteristics of the output device. However, it would also be beneficial to tailor the level of sharpening to the tonal response of the device as well.

All methods described in the prior art designed to modify the spatial detail in relation to a tone scale function are methods of tone scale function application. As such, the detail of the original image input to the tone scale function application algorithm has not yet been undesirably altered. The goal of these methods is the application of a tone scale function without damaging image detail. For applications in which a tone scale function has already been applied to an image the image detail has likewise already been modified. Thus the methods described in the prior art are not applicable to overcoming this shortcoming.

Consequently, a need exists for overcoming the above-described drawbacks. More specifically, a need exists for a method of restoring image spatial detail in an image processing step occurring after the application of a tone scale function. Also, a need exists for a method of modifying the image spatial detail in preparation for the anticipated application of a tone scale function.

SUMMARY OF THE INVENTION

The present invention is directed to overcoming one or more of the problems set forth above. Briefly summarized, according to one aspect of the present invention, the invention resides in a method for modifying the spatial frequency detail of a digital image channel, the method comprising: (a) receiving a digital image channel; (b) providing a tone scale function; and (c) modifying the spatial frequency detail of the digital image channel based on the characteristics of the tone scale function.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the advantage of modifying the spatial frequency detail of a digital image to compensate for the effects of the application of a tone scale function. The tone scale function may be applied to the digital image either before or after the application of the present invention in an image processing chain. As a result of the application of the present invention, the digital image displayed on the final output medium will appear more natural than a similar image processed without the present invention.

DETAILED DESCRIPTION OF THE INVENTION

In the following description, the present invention will be described in the preferred embodiment as a software program. Those skilled in the art will readily recognize that the equivalent of such software may also be constructed in hardware.

Figure 1:
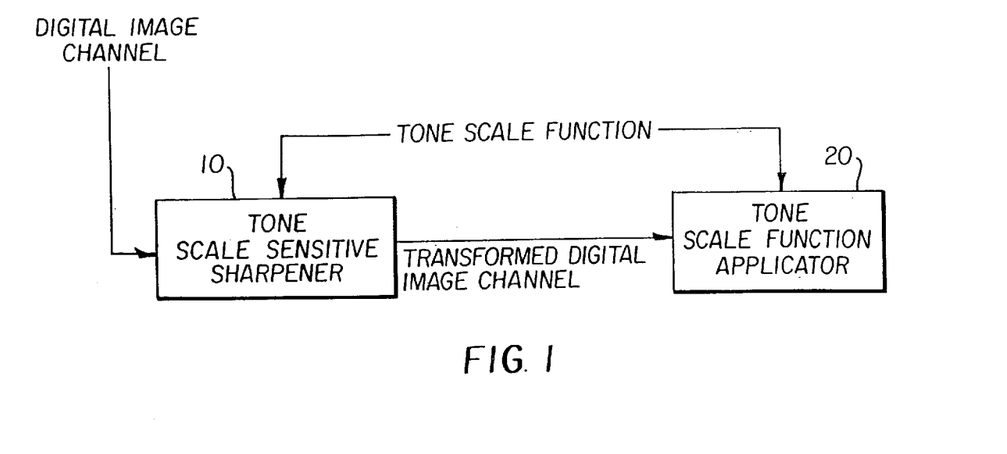
FIG. 1 is a block diagram illustrating an overview of the present invention.

Referring to FIG. 1, there is illustrated an overview of the present invention. Before discussing FIG. 1, it is instructive to note that the present invention utilizes a digital image which is typically a two-dimensional array of red, green, and blue pixel values, or a single monochrome pixel value corresponding to light intensities. In this regard, a digital representation of an image, typically in RGB color space consisting of separate red, green, and blue image channels, is transformed to a luminance-chrominance color space by a color space matrix transformation resulting in a luminance image channel and two chrominance image channels. It facilitates understanding to note that the present invention operates on only the luminance channel or individually on each chrominance channel, for example red, green and blue. This transformation into a luminance-chrominance is well known in the art.

Figure 2:
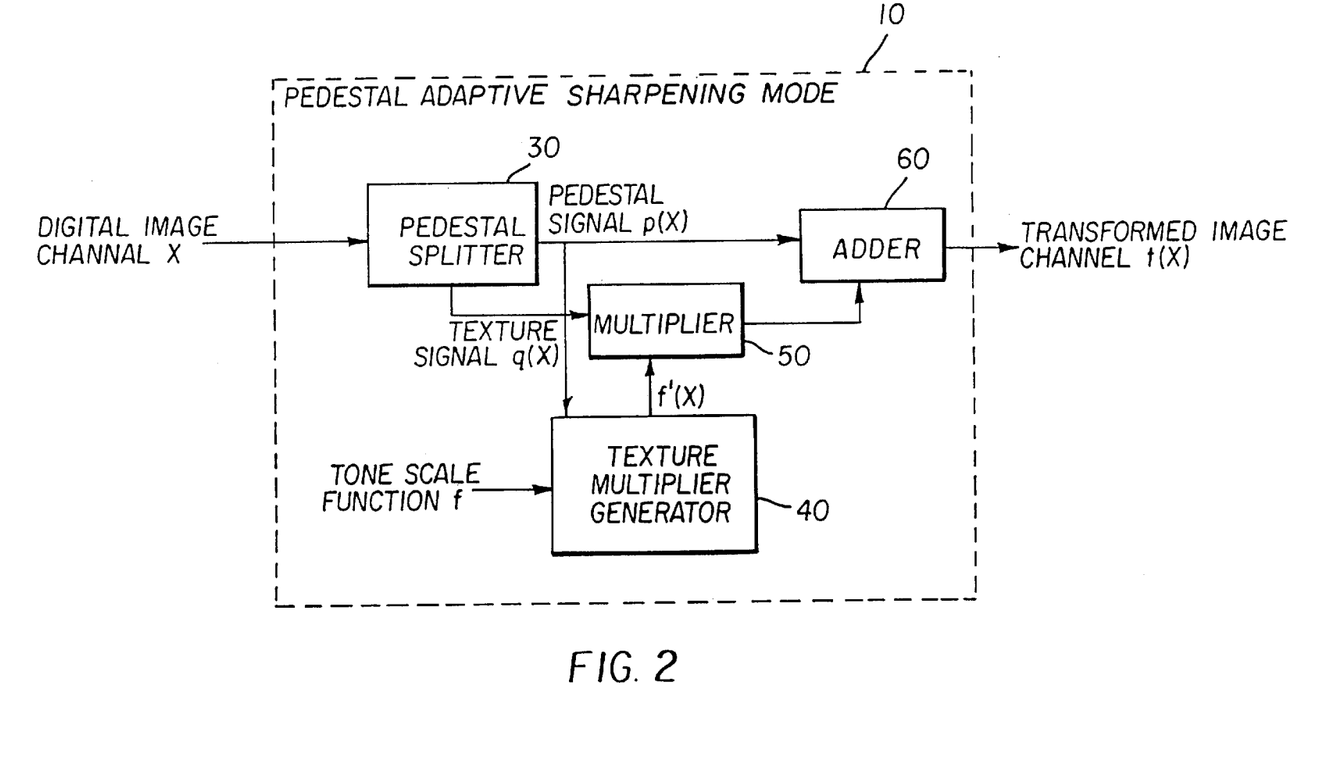
FIG. 2 is an exploded view of the tone scale sensitive sharpener of FIG. 1.
Figure 3:
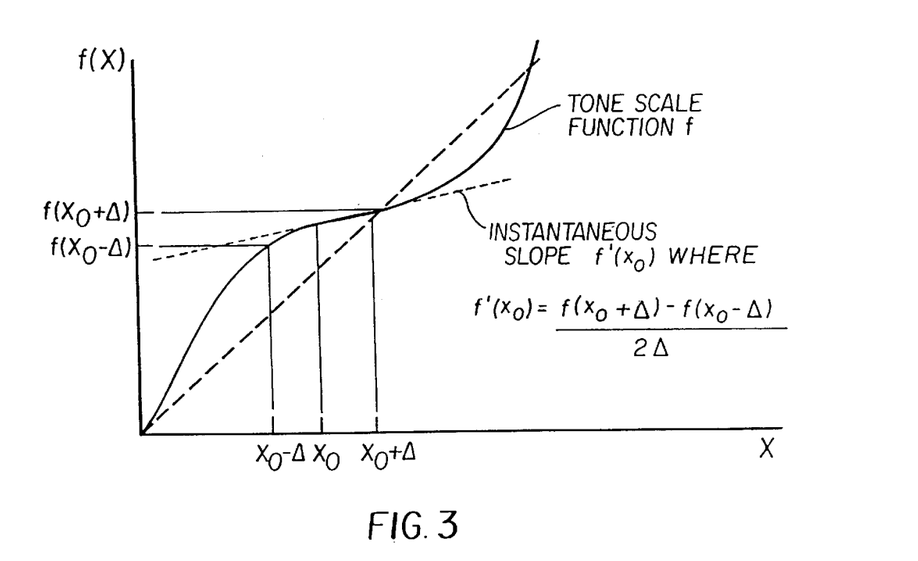
FIG. 3 is an illustration of a typical tone scale function.

Referring to FIGS. 1 and 2, a digital image channel is input into a tone scale sensitive sharpener 10 where the image is divided into two portions by a pedestal splitter 30—a pedestal signal and a texture signal, as will be described in detail below. The texture signal includes image high frequency information excluding the high frequency component of sharp edges, and the pedestal signal is the slowly varying signal except in the neighborhood of sharp edges. The texture multiplier generator 40 receives a user-defined tone scale function, and as illustrated in FIG. 3, calculates the local slope of the tone scale function evaluated at the value of the received pedestal signal. The tone scale function shown in FIG. 3 may be a tone scale function that is digitally applied, or may be the characteristic response of an input or output device. The texture multiplier generator 40 then transforms the calculated local slope into a texture multiplier value, as will be described in detail hereinbelow.

The texture signal is an example of a spatial frequency detail signal. Another example of a spatial frequency detail signal that is simpler to compute is the highpass image signal.

Referring back to FIGS. 1 and 2, the multiplier 50 receives the texture signal and the texture multiplier value from the texture multiplier generator 40, and generates the product of the two signals. Multiplication of one signal by another signal is well known in the art, and will not be further discussed. The adder 60 receives the pedestal signal from the pedestal splitter 30 and the signal output of the multiplier 50, and adds the two signals for forming a transformed image channel. Addition of two signals is well known in the art and will not be further discussed.

The signal output from the adder 60 is the transformed digital image channel. As shown in FIG. 1, the transformed digital image channel is input into the tone scale applicator 20 that applies the tone scale function, such that the application of the expected tone scale will not significantly alter the detail of the image as compared with the original image.

Figure 4:
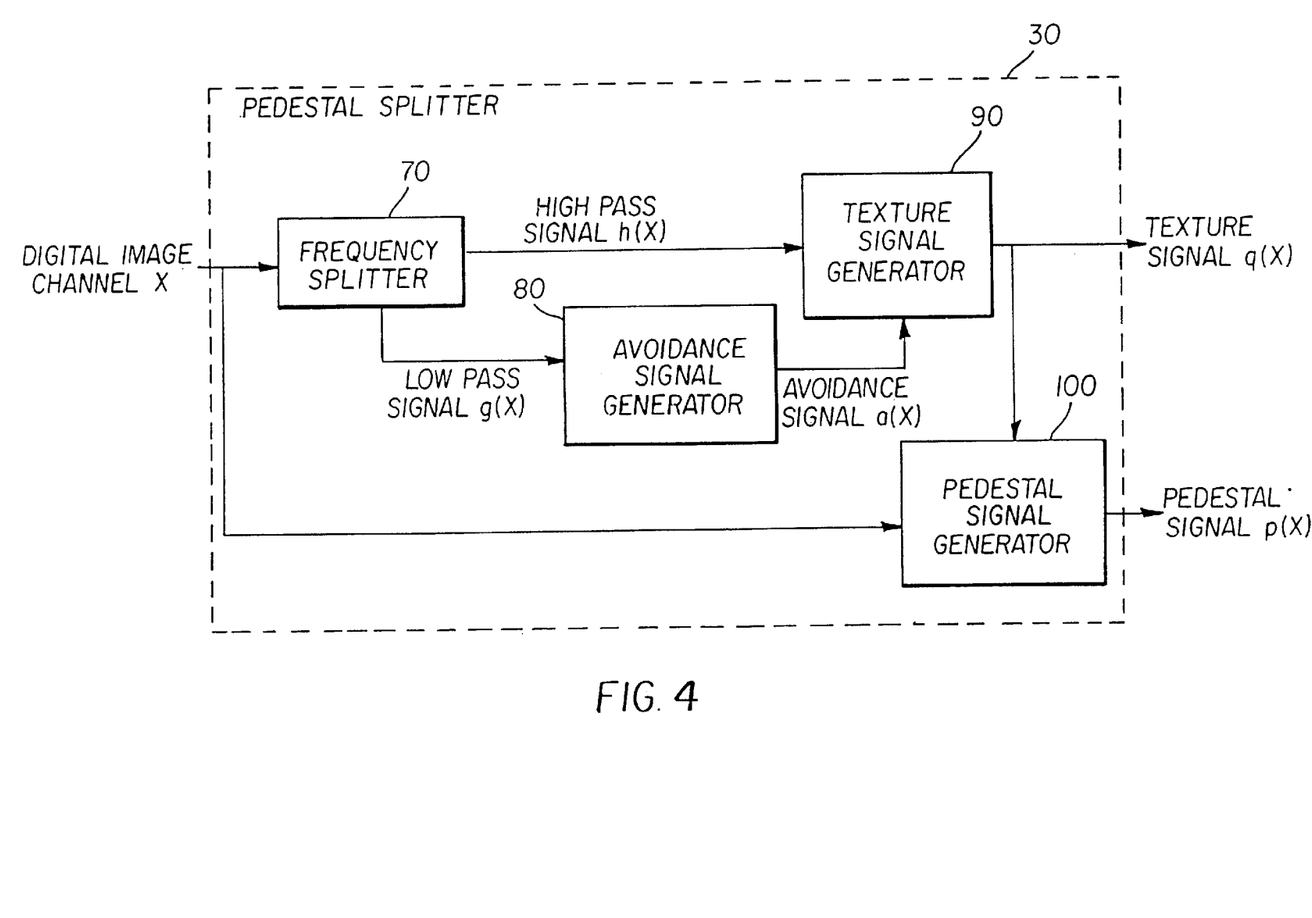
FIG. 4 is an exploded view of the pedestal splitter of FIG. 2.

Referring to FIG. 4, an exploded diagram of the pedestal splitter is shown. The digital image channel input into the pedestal splitter 30 is split into a highpass signal and a lowpass signal by spatial filtering procedure performed by a frequency splitter 70. The frequency splitter 70 uses well-known convolution to convolve the digital image channel with a digital filter, as will be described below. The convolved signal is the lowpass signal. The frequency splitter 70 then creates the highpass signal by subtracting the lowpass signal from the original image channel. Preferably, the digital filter is a Gaussian filter with a standard deviation (sigma) of 2.5 pixels. The preferred value of the standard deviation of the Gaussian filter may vary with image size. The value of 2.5 pixels for the sigma value was derived by optimizing the present invention with 1024 by 1536 pixel size images. This Gaussian filter is a two dimensional circularly symmetric low-pass filter whose filter coefficients may be derived by the following formula which is well known in the art:

$$G(i, j) = 1/(\text{sigma sqrt}(2\pi))\exp[-(i^2+j^2)/(2 \text{ sigma}^2)]$$

Where $G(i, j)$=the Gaussian filter coefficient at the $(i, j)^{th}$ pixel

Sigma=the standard deviation of the Gaussian filter (2.5)

$\pi$=the constant approximately 3.1415 . . .

The lowpass signal is input into an avoidance signal generator 80 for forming an avoidance signal, as will be described in detail below. A texture signal generator 90 receives both the highpass signal and the avoidance signal and both signals are multiplied therein for producing a texture signal.

The pedestal generator 100 receives the original image channel and the texture signal and subtracts the texture signal from the original image channel, which produces a pedestal signal.

A generalized linear spatial filter is described by the equation $$y_{ij} = \Sigma c_{mn} x_{mn}$$

where the $x_{mn}$ values represent local pixel values surrounding the $ij^{th}$ pixel and the $c_{mn}$ values represent numerical coefficients that do not depend on the pixel values $x_{mn}$. A non-linear spatial filter herein described shall be defined as a spatial filter which can not be described by the linear spatial filter equation. The output of applying a generalized control signal to an input signal bears a multiplicative relationship to the input signal. An example of applying a control signal is given by the equation:

$$y_{ij} = a_{ij} x_{ij},$$

where the $x^{ij}$ values represent the input signal $ij^{th}$ pixel values and the $a_{ij}$ values represent the $ij^{th}$ pixel values of the control signal. The result of applying a control signal to an input signal falls into the general category of a non-linear spatial filter if the control signal is derived from a spatial filtered version of the input signal. The avoidance signal $a(x)$ is an example of a control signal created from a spatially filtered version of the digital image channel. The texture signal $q(x)$ described in the preferred embodiment is an example of a non-linear spatial filter produced with the application of a control signal to the highpass signal.

Figure 5:
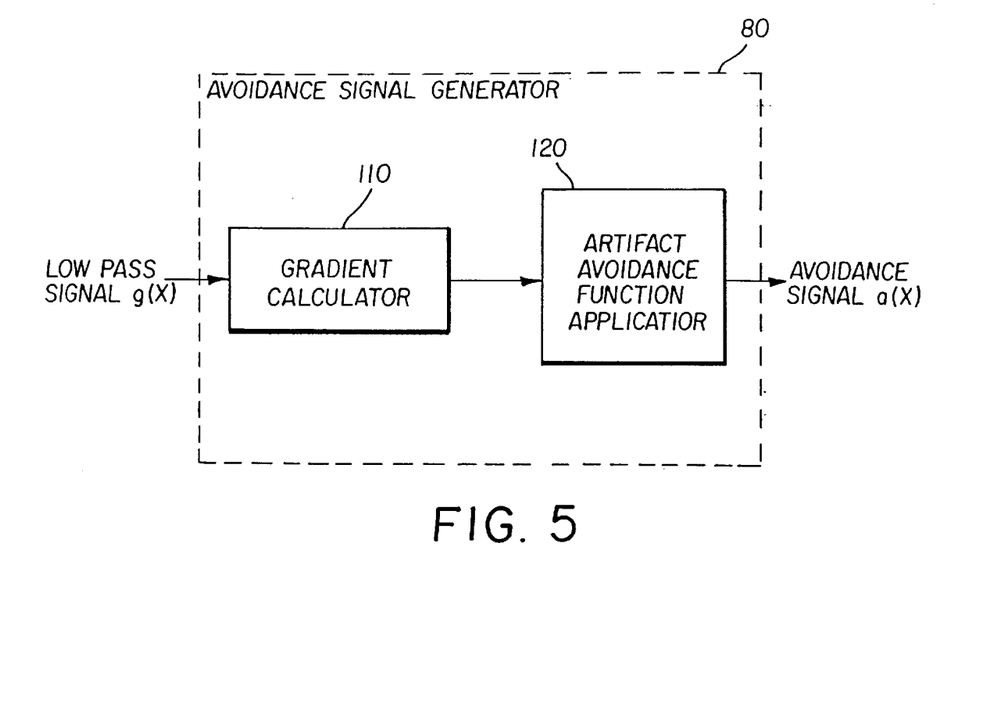
FIG. 5 is an exploded view of the avoidance signal generator of FIG. 4.

Referring to FIG. 5, there is illustrated an exploded block diagram of the avoidance signal generator 80. In this regard, the low pass signal is input into a non-directional squared gradient calculator 110 for producing a non-directional gradient signal. This calculation is performed by first calculating the difference between the pixel and its upper vertical neighbor, as well as the difference between the pixel and its horizontal neighbor to the right. The non-directional squared gradient is the sum of the squares of these two differences. The non-directional squared gradient signal is then mapped by an artifact avoidance function applicator 120 to produce an artifact avoidance signal as the output of the avoidance signal generator 80. This output signal of the avoidance signal generator 80 will from now on be referred to as a(x).

Figure 6:
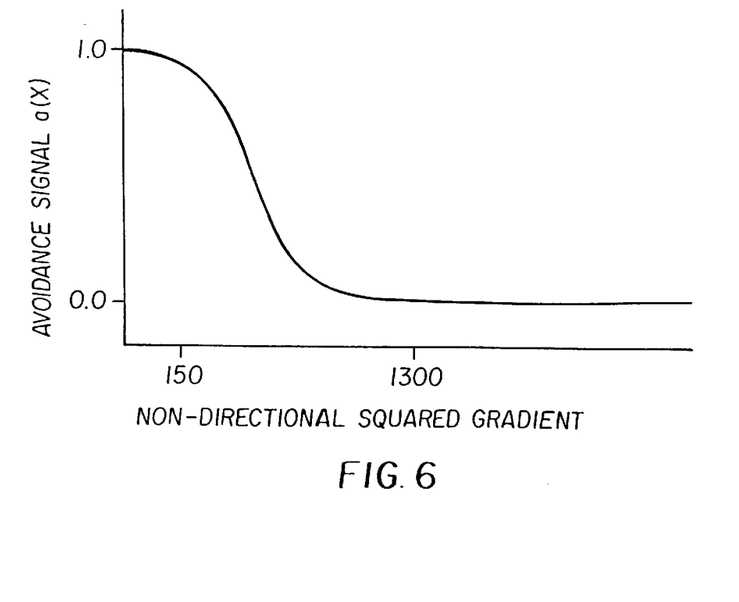
FIG. 6 is an illustration of an artifact avoidance function.

Referring to FIG. 6, this mapping function is performed by passing the non-directional squared gradient signal, ndg (x), through an artifact avoidance function av( ) formed in the following manner. The preferred embodiment of the present invention utilizes an artifact avoidance function defined by:

$$av(y) = (1/2)(1 + COS(\pi(y - C_o)/(C_1 - C_o))$$

$$\text{for } y > C_o \text{ and } y < C_1,$$

$$av(y) = 0$$

$$\text{for } y >= C_1 \text{ and}$$

$$av(y) = 1$$

for $y<=C_0$ where $C_0$ and $C_1$ are numerical constants.

The preferred values for $C_0$ and $C_1$ will vary according to the range of the input data. The input data range in the images used in the development of this preferred embodiment ranged from 0 to 4095. In this case, the preferred value for $C_0$ is 148, and the preferred value for $C_1$ is 1300. As an alternate method for constructing the artifact avoidance function is described in the following equation:

$$av(y) = 1 - sqrt((y - C_o)/(C_1 - C_o))$$

$$av(y) = 1 - ((y - C_o)/(C_1 - C_o))$$

$$\text{for } y >= C_o \text{ and } y <= C_1,$$

$$av(y) = 1$$

$$\text{for } y < C_o, \text{ and}$$

$$av(y) = 0$$

$$\text{for } y > C_1.$$

Those skilled in the art will realize that the artifact avoidance function av(x) may realize many forms. Performance of the present invention does not depend upon a specific equation for av(x).

Still referring to FIG. 5, the artifact avoidance signal, a(x), is generated by the artifact avoidance function applicator 120. This is accomplished by applying the artifact avoidance function av(x), to the non-directional gradient signal ndg(x). The mathematical result is described by the equation:

$$a(x)=av(ndg(x)).$$

The artifact avoidance function is most efficiently implemented as a look-up-table (LUT).

Figure 7:
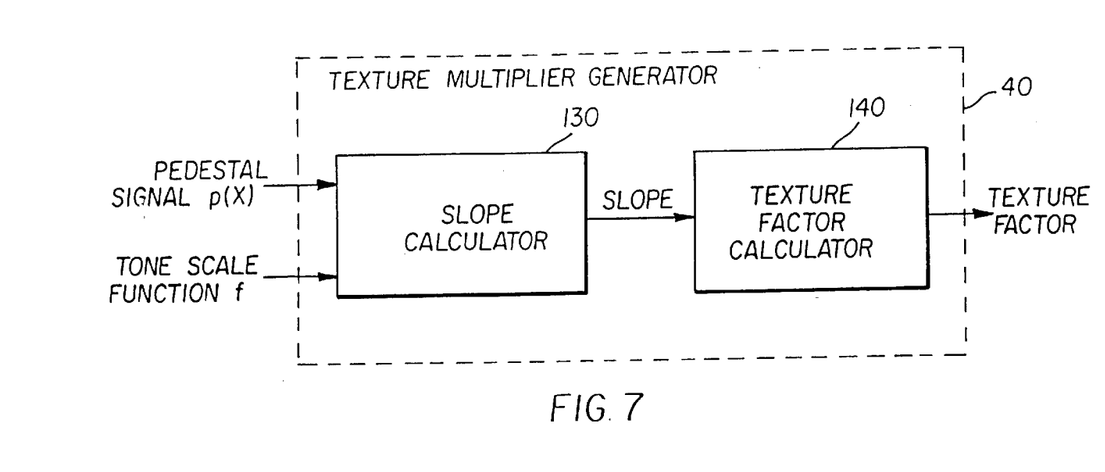
FIG. 7 is an exploded view of the texture multiplier generator of FIG. 2.

Referring to FIG. 7, therein is illustrated an exploded view of the texture multiplier generator 40. The user-defined tone scale function f(x) and the pedestal signal p(x) are applied to the inputs of the slope calculator 130. The slope calculator 130 evaluates the slope of the tone scale function at the value of the pedestal signal. The slope of the tone scale may be calculated with the following equation:

$$f'(p(x))=[f(p(x)+\Delta)-f(p(x)-\Delta)]/(2\Delta)$$

where $\Delta$ is a relatively small integer. In the preferred embodiment, $\Delta=5$. This may most efficiently accomplished by calculating the slope of the tone scale f(x) for all possible values of x and forming a LUT which returns f'(x) for an input of x. The slope calculator 130 may then index into such a LUT with the value of the pedestal signal in order to derive the local slope of the tone scale function.

Again referring to FIG. 7, the value of the slope output from the slope calculator 130 is input to the texture factor calculator 140. The texture factor calculator 140 converts the slope from the slope calculator 130 into the texture multiplier factor by which the texture signal will be scaled with the multiplier 50 in FIG. 2. The general form of the equation used to convert the slope to the texture factor is:

$$tf(x)=B/f'( )$$

where:

tf(x)=texture factor

B=normalization factor f'( )=local slope of tone scale function output from slope calculator 130

The B variable is typically set to 1.0, however values other than one may be used in cases where the desire is to either decrease or increase the overall gain to the detail signal of the image after the application of the tone scale function.

Figure 8:
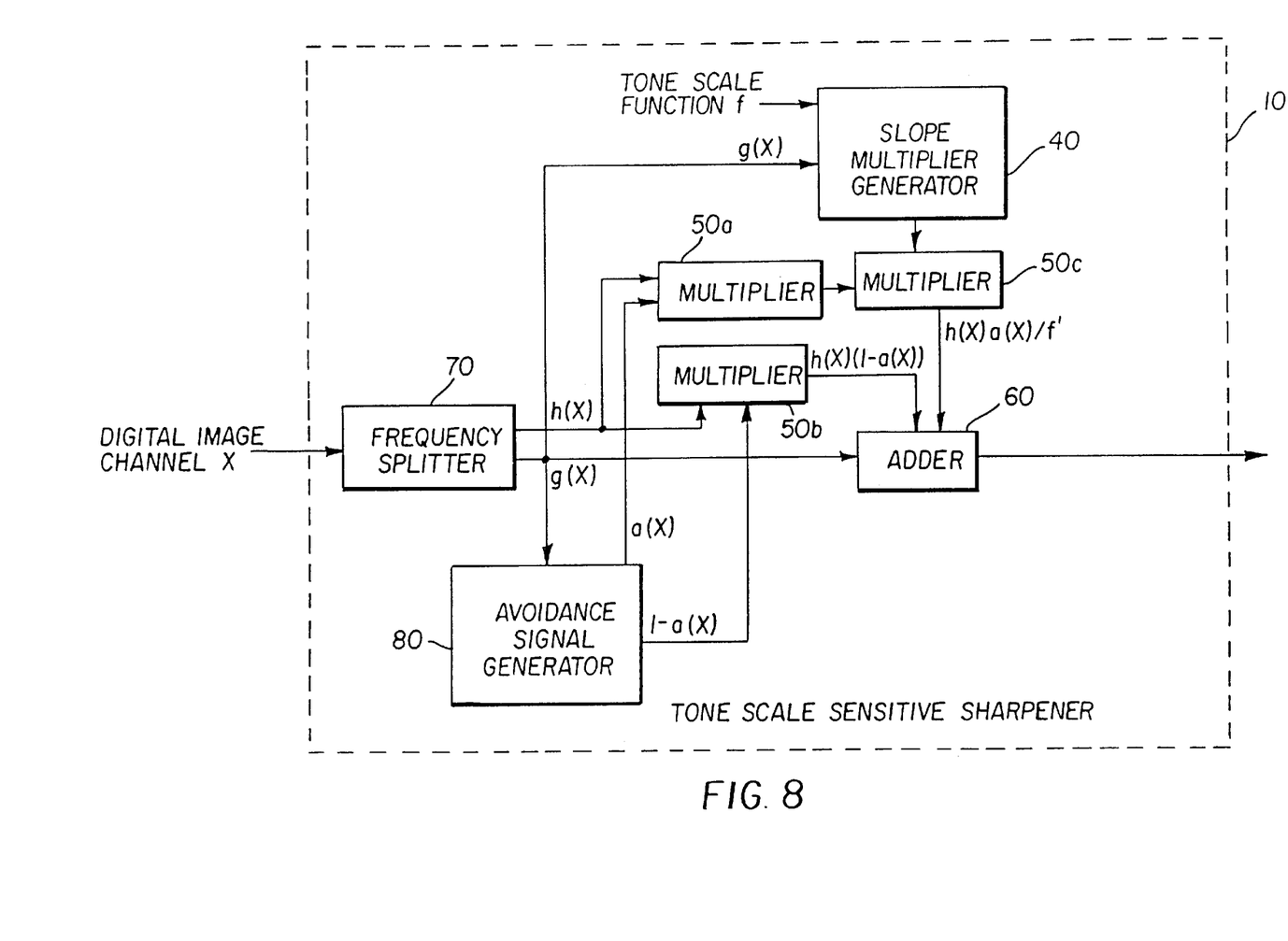
FIG. 8 is an alternative embodiment of the present invention.

Referring to FIG. 8, there is illustrated an alternative configuration of the present invention. In this configuration, the digital image signal is passed through a frequency splitter 70, creating a lowpass signal and a highpass signal from the original digital image channel. In this regard, the lowpass signal is then passed through the avoidance signal generator 80 in order to generate the artifact avoidance signal. The lowpass signal and tone scale function f(x) are passed into the slope multiplier generator 40b, which performs substantially the same operation as the texture multiplier generator 40 previously described hereinabove. In this case, the exception is that the slope calculator 130 evaluates the slope at the value of the lowpass signal rather than the pedestal signal value. The texture signal output from the slope multiplier generator 40b then is multiplied by a multiplier 50c with the product of the multiplier 50a of the avoidance signal and the highpass signal. The product so formed is applied to the input of the adder 60. Also applied to the input of the adder 60 is the lowpass signal as well as the output of multiplier 50b which formed the product of the highpass signal and (1−a(x)). The output of the adder 60 is a processed image channel in which texture content has been adjusted to compensate for the application of a tone scale function to the processed image. The output of the adder 60 is very similar to the output of the preferred embodiment of the present invention.

Figure 9:
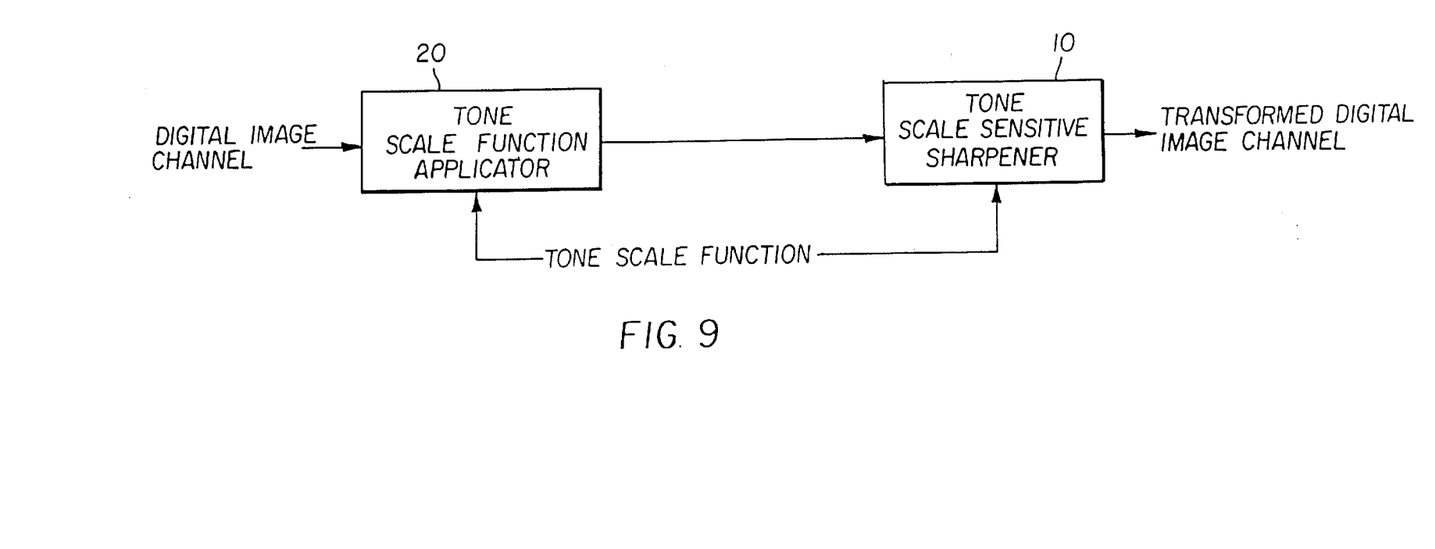
FIG. 9 is an alternative embodiment of FIG. 1.

Referring to FIG. 9, there is illustrated an alternative embodiment of the present invention. In this embodiment, the input to the tone scale sensitive sharpener 10 is the tone scaled image channel that was output from the tone scale function applicator 20.

Mathematics:

The final processed pixel of the preferred embodiment may also be represented in functional form:

$$t(x)=x-a(x)h(x)+a(x)(h(x))/f'(x-a(x)h(x)) \quad (1)$$

Where:

x=the input image channel t(x)=transformed digital image channel g(x)=a low-pass filtered version of x h(x)=a high-pass filtered version of x. i.e. h(x)=x−g(x)

f'(x)=slope of the tone scale function, evaluated at x a(x)=the artifact avoidance signal (the control signal)

A mathematical analysis of the present invention may be used to show the operation of the present invention in regions of the image where the a(x) signal is 1, and regions of the image where the a(x) is 0. By analyzing the preferred embodiment and the alternative embodiment, the present invention is shown to be nearly equivalent in each case. Those skilled in the art will realize that there exist many possible embodiments that result in equivalent operation to the present invention when analyzed by the following method.

The artifact avoidance signal a(x) is 1 for pixels in regions of the image which are generally flat. The signal a(x) becomes 0 for pixels in regions of the image that contain high transition edges. The signal a(x) may take on any value within the range of 0.0 to 1.0 depending upon the structure of the local region of the image.

At this point, it becomes useful to make several approximations. The first is that with the nearly linear tone scale functions which are common to image processing, $$g(f(x))=f(g(x)) \quad (2)$$

approximately.

Secondly, in the case where a tone scale f(x) is applied to a signal x, the result is approximately:

$$f(x)=f(g(x))+f'(g(x))*(h(x)) \quad (3)$$

Because of the nearly linear (slowly varying second derivative) nature of most tone scales, the application of a tone scale to an image signal is nearly equivalent to applying the tone scale to the low-pass of the original image channel, and scaling the high-pass of the original image channel by the slope of the tone scale function, evaluated at low-pass of the original image channel.

The third approximation follows directly from the first and second approximations.

$$f'(g(x))*(h(x))=h(f(x)) \quad (4)$$

Thus, if the equation summarizing the preferred embodiment is evaluated with the three approximations, the resulting approximation for the output pixel value in relatively flat regions (a(x)=1) becomes:

$$t(x)=x+h(x)[1/f'(g(x))-1].$$

This result implies that in relatively flat regions of the image, the detail signal of the processed pixel is equal to the detail signal of the original h(x), scaled by a factor which pre-compensates the detail for the slope of the anticipated tone scale function. Likewise, when the equation is simplified with the assumption that the pixel to be processed is near a high transition edge (a(x)=0), $$t(x)=x.$$

This result implies that the processed version of an original pixel in a region near a high transition edge is equal to the original pixel value. This result prevents the occurrence of artifacts at the edge regions.

For pixels with an intermediate value of a(x), (0<a(x)<1), the processed pixel will be bounded by f(x) and f(g(x))+h(x).

In summary, the method of the current invention allows an image to be preprocessed in anticipation of a specific tone scale function. The image is sharpened with a gain factor related to the inverse of the local slope of the tone scale function, except in those regions of the image where sharpening of the detail would produce unnatural artifacts. When the tone scale function is applied to the processed image, the detail of the resultant image will be similar to the detail of the original image.

Many other flow diagrams may be constructed which will produce a result that, when evaluated with the three approximations, will be:

$$t(x)=x+h(x)[1/f'(g(x))-1] \text{ for } (a(x)=1)$$

$$t(x)=f(x) \text{ for } (a(x)=0)$$

These alternative flow diagrams may appear quite different from the one described by the preferred embodiment, but utilize the same components of an avoidance signal, frequency decomposition by spatial filtering, and a tone scale function. The images processed with these various methods often contain small numerical differences (because of the approximations), but produce results that are visually comparable.

For example, the alternative embodiment shown in FIG. 8 may be written algebraically from the flow diagram as:

$$t(x)=g(x)+[1-a(x)]h(x)+a(x)(h(x))/f'(g(x)).$$

This equation may be evaluated with a(x)=1.0 (i.e. flat regions of the digital image channel ) and with a(x)=0 (i.e. edge regions of the image) by the three approximations (equations (2), (3), and (4)) to yield:

$$t(x)=x+h(x)[1/f'(g(x))-1] \text{ for } (a(x)=1)$$

$$t(x)=f(x) \text{ for } (a(x)=0)$$

Thus, the alternative embodiment of the present invention is similar (within the limits of the mathematical approximations) to the preferred embodiment.

After the present invention performs its operations, the digital image is preferably transformed back into RGB color space by an inverse color space matrix transformation for permitting printing a hardcopy or displaying on an output device.

The invention has been described with reference to a preferred embodiment. However, it will be appreciated that variations and modifications can be effected by a person of ordinary skill in the art without departing from the scope of the invention.

What is claimed is:

1. A method for modifying the spatial frequency detail of a digital image channel, the method comprising:

(a) receiving a digital image channel comprised of local image pixel values;

(b) providing a tone scale function that is a function of the local image pixel values;

(c) obtaining the local slope of the tone scale function, which local slope varies on a pixel-by-pixel basis; and (d) modifying the spatial frequency detail of the digital image channel in proportion to an inverse function of the local slope.

2. The method as in claim 1, wherein step (a) includes receiving the digital image channel having the tone scale function applied to the digital image channel.

3. The method as in claim 1 further comprising the step of applying the tone scale function after step (d).

4. The method as in claim 1 further comprising the step of applying a tone scale function approximating the characteristic tonal response of an output device.

5. The method as in claim 4 in which the output device is a printer.

6. The method as in claim 4 in which the output device is a display monitor.

* * * * *